United States Patent [19]
McClanahan

[11] Patent Number: 5,720,102
[45] Date of Patent: Feb. 24, 1998

[54] METHOD FOR MAKING A DRIVE LINE SLIP JOINT ASSEMBLY

[75] Inventor: Virginia L. McClanahan, Monclova, Ohio

[73] Assignee: Dana Corporation, Toledo, Ohio

[21] Appl. No.: 379,725

[22] Filed: Jan. 27, 1995

[51] Int. Cl.$^6$ ................................................ B21D 53/10
[52] U.S. Cl. .................... 29/898.12; 29/458; 29/527.2; 29/898.13; 156/289; 264/271.1; 264/296; 427/355; 427/357; 427/271
[58] Field of Search ............................ 29/458, 527.2, 29/898.03, 898.12, 898.13; 427/271, 355, 357; 156/245, 289; 264/271.1, 296

[56] References Cited

U.S. PATENT DOCUMENTS

| | | |
|---|---|---|
| 1,482,000 | 1/1924 | Engman . |
| 4,033,020 | 7/1977 | Hudgens . |
| 4,552,544 | 11/1985 | Beckman et al. . |
| 5,042,153 | 8/1991 | Imao et al. . |
| 5,114,521 | 5/1992 | Isegawa et al. . |
| 5,243,874 | 9/1993 | Wolfe et al. . |

FOREIGN PATENT DOCUMENTS

| | | |
|---|---|---|
| 226715 | 7/1994 | Japan . |
| 1542127 | 3/1979 | United Kingdom . |
| 2027163 | 2/1980 | United Kingdom . |

*Primary Examiner*—Joseph M. Gorski
*Attorney, Agent, or Firm*—MacMillan, Sobanski & Todd

[57] ABSTRACT

A method for making a drive line slip joint assembly of the type having a slip yoke and a yoke shaft, the yoke shaft telescopically engaging an internal bore through one end of the slip yoke, the yoke shaft having an externally splined portion with splines extending radially outwardly from a central axis, and the slip yoke having an internally splined portion with splines extending radially inwardly toward the central axis, with the splines of the yoke shaft intermeshing with the splines of the slip yoke to form a driving connection between the yoke shaft and the slip yoke, includes coating the splines of either the yoke shaft or the slip yoke with a low friction coating, heating the yoke shaft and the slip yoke to a temperature sufficient to soften the low friction coating, centering the yoke shaft with respect to the slip yoke, inserting the yoke shaft into the internal bore of the slip yoke, and cooling the yoke shaft and slip yoke.

18 Claims, 2 Drawing Sheets

METHOD FOR MAKING A DRIVE LINE SLIP JOINT ASSEMBLY

BACKGROUND OF THE INVENTION

This invention relates in general to drive line torque couplings or drive line slip joints suitable to provide a non-rotatable connection of telescoping members for transmission of rotational force or torque. In particular, this invention relates to drive line slip joint assemblies which employ a splined male member which fits slidably into a female member having a splined internal bore.

Drive line systems used in vehicles and other machinery often require connection between two rotating, generally collinear or coaxial drive line shafts for the transmission of torque from one component to another. The connection itself is a non-rotatable connection so that rotative motion of one of the shafts rotates the other shaft. These connections typically must be slidable connections for ease of assembly in the vehicle. Also, a slidable connection allows some relative movement in the axial direction for shock absorption during normal vehicle operation and for energy absorption during a vehicle crash. The drive line connection is a slip joint because of the telescoping arrangement of one drive shaft, referred to as the yoke shaft, into a bore of the other drive shaft, referred to as the slip yoke. Splines are provided on the outside of the yoke shaft (male drive shaft) which correspond and intermesh with splines in the bore of the slip yoke (female drive shaft). The intermeshing of the splines of the male and female components enables torque to be applied from one drive shaft to the other.

Drive line slip joints are used in steering assemblies for vehicles to transmit torque from the steering wheel to the wheels or steerable members of the vehicle. Other uses include power take offs and drive lines to various rotating vehicle parts such as the rear wheels of rear wheel drive vehicles. To provide a non-rotatable connection, the splines on the yoke shaft must be exactly complementary with the splines on the slip yoke. However, the two shafts must be free to move longitudinally or axially with respect to each other. To facilitate the relative axial movement, a low friction coating, such as a nylon coating, is applied to either the male splines or to the female splines, or to both. The low friction coating enables an even closer fit or tighter tolerance between the yoke shaft and the slip yoke while still allowing relative axial movement between the yoke shaft and the slip yoke.

One method for applying low friction coatings to the splines of the yoke shaft is to prime the splines and dip them into a bath of molten low friction coating. Alternatively, the yoke shaft splines can be coated by heating the splines and immersing them into a fluidized bed of low friction coating in particulate form. Also, the splines can be coated elctrostatically with the low friction coating in a particulate form. It is also known to apply the low friction coating by injection molding between the assembled male and female parts.

A problem with most slip joint connections is that the tolerance or gap between the intermeshing parts required to enable the male and female parts to slide axially relative to each other enables some play or wobble when transmitting torque from one drive shaft to another. Looseness in the rotative direction, where one drive shaft can slightly rotate relative to the other drive shaft, is known as backlash. Looseness in a direction transverse to the axis of the drive shafts, or in a cantilevered manner, is known as broken back. Attempts in the past to solve backlash and broken back have not been entirely successful. One method, as disclosed in U.S. Pat. No. 4,552,544 to Beckman et al., provides for machining or broaching almost all of the radially outward face of the male splines while leaving a ridge or unbroached portion which remains raised up as a resilient protuberance. The protuberance takes up the radial slack between the two drive shafts. Unfortunately, the broaching process is costly and time consuming, and involves precision adjustment and constant sharpening of the broaching tools.

Another method for solving backlash and broken back is to use injection molding of a plastic or gasket material to fill the gap between the intermeshing splines of a drive line slip joint assembly. This method is difficult to control, however, because the process requires extremely even heating, which is difficult to achieve. There is a need for improvements in methods for making low friction coatings which enable easy axial movement of the yoke shaft relative to the slip yoke while eliminating backlash and broken back in slip joint assemblies.

SUMMARY OF THE INVENTION

This invention relates to a method for applying a low friction coating to components of a slip joint assembly so that the problems of backlash and broken back are practically eliminated. Either the yoke shaft or the slip yoke of the slip joint assembly is coated with a low friction coating. The yoke shaft and the slip yoke are heated to a temperature sufficient to soften the low friction coating and the yoke shaft is inserted into the internal bore of the slip yoke. The heat of the yoke shaft and the slip yoke cause the low friction coating to flow and conform to the gap between the splines of the yoke shaft and the slip yoke. The yoke shaft is removed from the slip yoke, and the low friction coating is allowed to cool.

The method of the invention is particularly applicable for drive line slip joint assemblies of the type having a slip yoke and a yoke shaft, with the yoke shaft telescopically engaging an internal bore through one end of the slip yoke. The yoke shaft has an externally splined portion with splines extending radially outwardly from a central axis, and the slip yoke has an internally splined portion with splines extending radially inwardly toward the central axis. A low friction coating applied to the yoke shaft melts upon the heating of the yoke shaft and forms a liquid layer on the surface of the externally splined portion of the yoke shaft. The liquid silicone release agent causes a slight cooling of the yoke shaft, and causes the surface of the liquid low friction coating on the yoke shaft to harden or skin over.

In a specific embodiment of the invention, the low friction coating is applied to the splines of the yoke shaft. Preferably, a lubricant is applied to the yoke shaft to facilitate release of the low friction coating from the slip yoke. The low friction coating preferably has a coefficient of thermal expansion greater than that of both the yoke shaft and the slip yoke so that upon cooling the low friction coating will shrink more than the yoke shaft and the slip yoke, thereby creating a gap between the coated splines of the yoke shaft and the splines of the slip yoke.

According to this invention, there is also provided a drive line slip joint assembly comprising a slip yoke and a yoke shaft, the yoke shaft telescopically engaging an internal bore through one end of the slip yoke, where the yoke shaft has a low friction coating on the yoke shaft splines, and where there are selected areas of increased thickness of the low friction coating which are integrally formed from the low friction coating and which provide means for enhancing the dynamic balancing of the drive line slip joint assembly.

DETAILED DESCRIPTION OF THE PREFERRED EMBODIMENT

Figure 1:
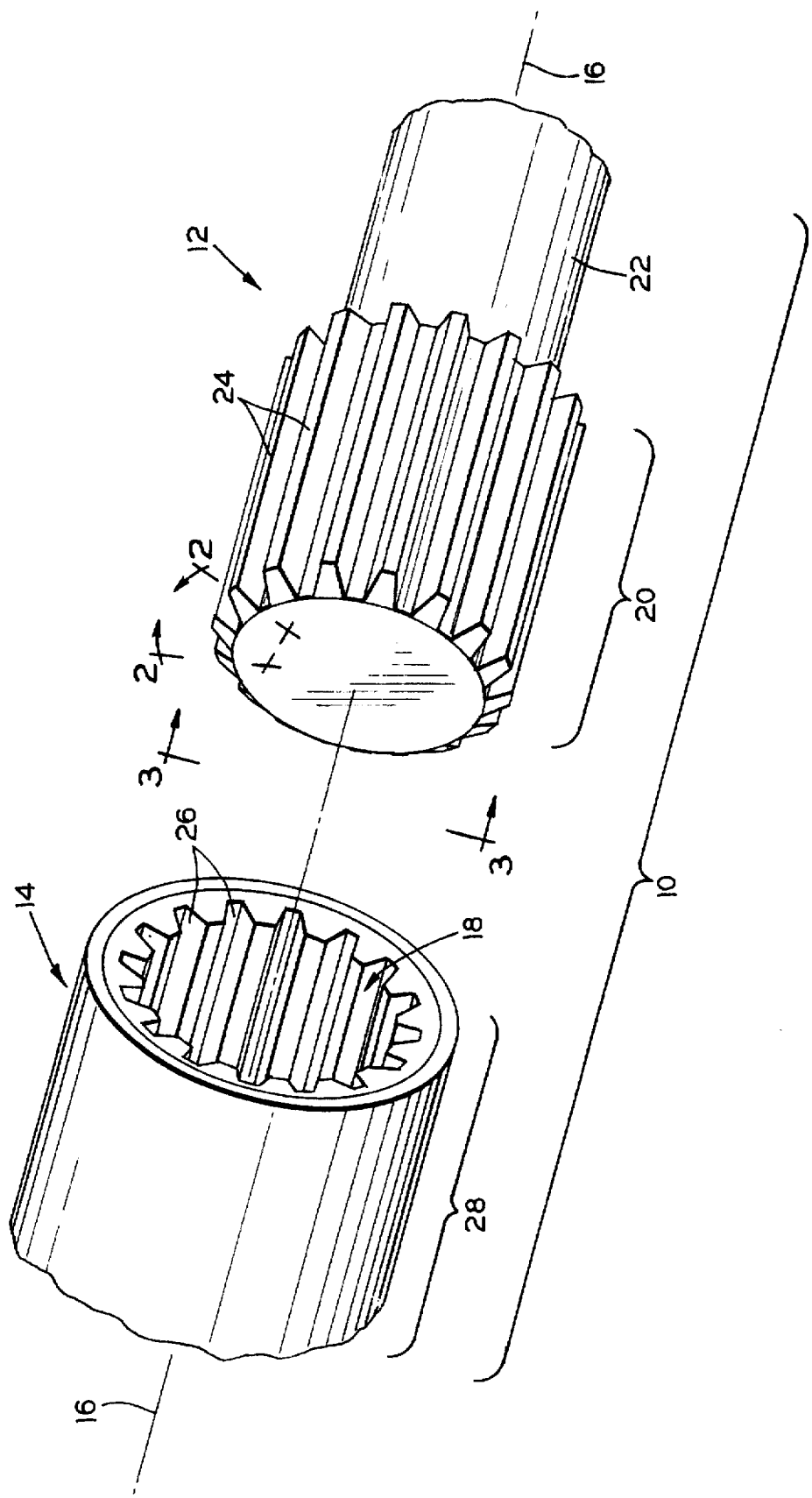
FIG. 1 is a schematic view in perspective illustrating a slip joint assembly made according to the method of the invention.

Referring now to the drawings, there is illustrated in FIG. 1 a schematic view of a drive line slip joint assembly 10 made according to the method of the invention. The slip joint assembly 10 is generally comprised of two slidably connected tubular members, yoke shaft 12 and slip yoke 14. The yoke shaft and the slip yoke are aligned for rotation around a common axis, central axis 16. The slip yoke 14 has an internal bore 18 at one end, and the internal bore is adapted to receive the yoke shaft 12 in a telescoping arrangement.

The telescoping nature of the yoke shaft 12 and the slip yoke 14 enables the slip joint assembly to be more easily installed in a vehicle, and enables relative axial movement between the yoke shaft and the slip yoke to accommodate forces transmitted to the lower member by the movement of the vehicle over rough roads. Also, the ability of the yoke shaft to move relative to the slip yoke enables the beneficial absorption of energy in a vehicle crash.

The yoke shaft 12 can be any member suitable for transmitting torque to or receiving torque from another similar member. The yoke shaft can be constructed of any material, such as steel or aluminum. The yoke shaft is comprised of externally splined portion 20, which is adapted to be telescopically inserted into the internal bore 18 of the slip yoke 14, and male shaft portion 22 which constitutes the main body or segment of the yoke shaft. For a typical steering column drive line slip joint assembly made according to the invention, the externally splined portion 20 is about four inches long.

Numerous splines 24 are positioned circumferentially around the externally splined portion 20 of the yoke shaft 12. The yoke shaft splines extend radially outwardly from central axis 16. Splines for transmitting torque in drive line slip connections are well known in the art. The yoke shaft splines 24 are adapted to mesh with slip yoke splines 26 which are positioned on the inside of internal bore 18, along internally splined portion 28 of the slip yoke 14, thereby enabling the yoke shaft 12 and the slip yoke 14 to be placed in a non rotating (relative to each other) relationship. The manufacture and operation of the apparatus so far described is well known in the art.

Figure 2:
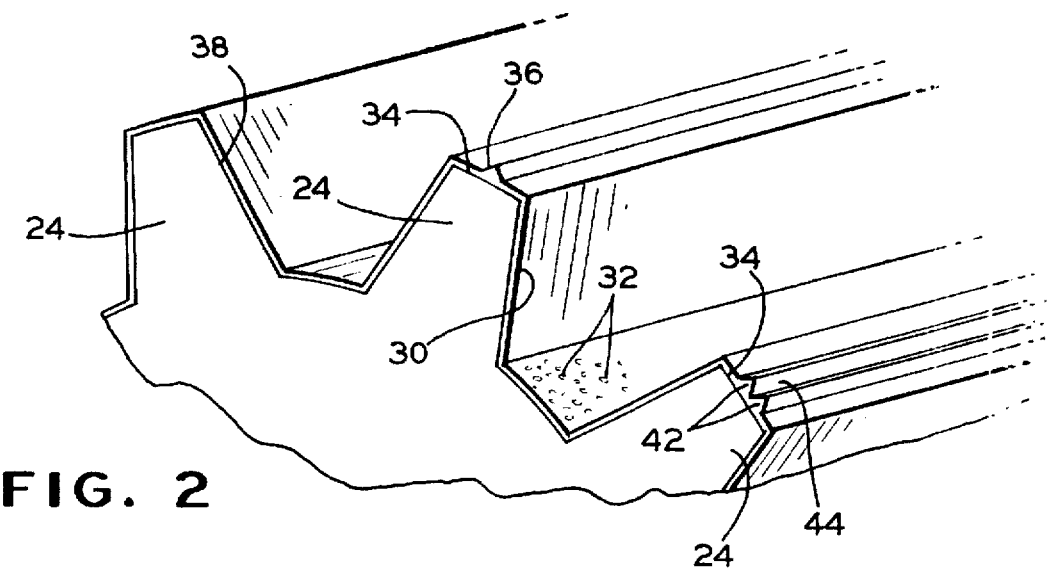
FIG. 2 is an expanded schematic view in perspective taken along lines 2—2 of FIG. 1, illustrating some of the details of the splines on the yoke shaft.

As shown in FIG. 2, a low friction coating 30 is applied to the yoke shaft splines 24. The low friction coating can be any material, such as a thermoplastic material, which facilitates sliding movement of the yoke shaft splines 24 relative to the slip yoke splines 26. A preferred low friction material is Nylon II, available from various suppliers of nylon materials. Although the low friction coating is shown on the yoke shaft splines only, it is to be understood that the low friction coating can be placed on either the yoke shaft splines, the slip yoke splines, or both. The low placed on either the yoke shaft splines, the slip yoke splines, or both. The low friction coating can be applied to the yoke shaft splines in several ways. In a conventional coating process, the yoke shaft splines 24 and externally splined portion 20 are grit blasted and cleaned to prepare the surface. Then the yoke shaft is dipped into a primer. The yoke shaft 12 and the slip yoke 14 are then heated in an oven to a temperature within the range of from about 500° F. to about 550° F. The temperature required for low friction coatings other than Nylon II may be different. The yoke shaft is then dipped first into a fluidized bed of the low friction coating in particulate form, and then into a liquid release agent, such a silicone release agent. Since the yoke shaft has been heated to about 500° F. or higher, the particulate low friction coating will melt and form a liquid layer on the surface of the externally splined portion 20 of the yoke shaft 12. The liquid silicone release agent causes a slight cooling of the yoke shaft, and causes the surface of the liquid low friction coating on the yoke shaft to harden or skin over. The use of primers, low friction coatings and release agents are all well known to those skilled in the art. The yoke shaft 12 is then inserted into the slip yoke 14, and removed for cooling. The cooling can be by natural convection, i.e., exposure to room temperature air. Alternatively, the cooling can be done in a controlled manner with, for example, air flows or water sprays. It is, of course, imperative that the yoke shaft and the slip yoke be perfectly aligned during the insertion of the yoke shaft into the slip yoke. The yoke shaft and the slip yoke must be aligned or centered both radially and concentrically.

Upon insertion of the yoke shaft 12 into the slip yoke 14 the heat of the slip yoke causes a slight remelting of the skin of the low friction coating. Any excess nylon coating is squeezed and redistributed during the insertion. The effect on the low friction material is similar to an ironing process. The heating and insertion of the yoke shaft 12 into the slip yoke 14 creates a mated pair of drive line slip joint components, which together comprise the slip joint assembly 10. Prior to insertion of the yoke shaft into the slip yoke the low friction coating has a thickness which provides an interference fit within the range of from about 0.002 to about 0.008 inches. Preferably, the low friction coating has a coefficient of thermal expansion which will cause it to shrink upon cooling. This shrinking of the low friction coating insures that the gap between the intermeshing splines 24 and 26 is not completely filled, so that the yoke shaft and slip yoke can be slidably moved axially with respect to each other. Ideally, the coefficient of thermal expansion of the low friction coating is greater than the coefficients of thermal expansion of the yoke shaft and the slip yoke, so that upon cooling, the yoke shaft and the slip yoke will contract less than the low friction coating, thereby creating a gap between the splines 24 and the splines 26. Typically, the low friction coating shrinks up to about eight to ten times as much as the yoke shaft and the slip yoke. The heating and ironing of the low friction coating process during the insertion of the yoke shaft can be somewhat controlled by controlling the temperature of the female part, i.e. the slip yoke 14. Specifically, the amount of shrinkage of the low friction coating, and therefore the fit of the completed yoke shaft into the slip yoke, can be controlled by the relative temperatures of the slip yoke and the yoke shaft.

In an alternative method of applying the low friction coating, the grit blasted and cleaned externally splined portion 20 of the yoke shaft 12 is coated with particulate low friction coating material by an electrostatic process at room temperature. The excess particulate low friction material is then removed from the male shaft portion 22 of the yoke shaft 12 by any suitable process, such as by wiping or vacuuming. Then the yoke shaft and the slip yoke are heated to a temperature of at least about 500° F., and the externally splined portion 20 of the yoke shaft is dipped into the liquid silicone bath. The yoke shaft 12 is then inserted into the slip yoke 14 and removed for cooling.

In a preferred embodiment of the invention, there is sufficient moisture in the lubricant and/or in the low friction coating itself that, upon insertion of the yoke shaft 12 into the heated slip yoke 14, some of the moisture will vaporize, creating a gas bubble. This causes the surface of the externally splined portion 20 and the splines 24 to be pitted or pockmarked with a plurality of depressions 32, as shown in FIG. 2. These depressions are beneficial in that they serve as reservoirs or flow channels for lubricants.

As shown in FIG. 2, the yoke shaft splines 24 have radially outward spline faces 34. In a specific embodiment of the invention, the spline faces are optionally contacted shortly after the yoke shaft 12 is removed from the slip yoke 14, while the low friction coating 30 is still warm and deformable. By contacting the low friction coating prior to cooling, it can be deformed or perturbed to create selected areas of increased low friction coating thickness, such as ridge 36. This ridge is can be shaped to extend along the length of one or more of the splines 24. The ridge, being made of the low friction coating material, is somewhat resilient, and resists rotational and cantilevered movement of the yoke shaft 12 within the slip yoke 14, thereby minimizing or reducing backlash and broken back. Alternatively, the ridge 36 can be positioned on the sides 38 of the yoke shaft splines 24.

Figure 3:
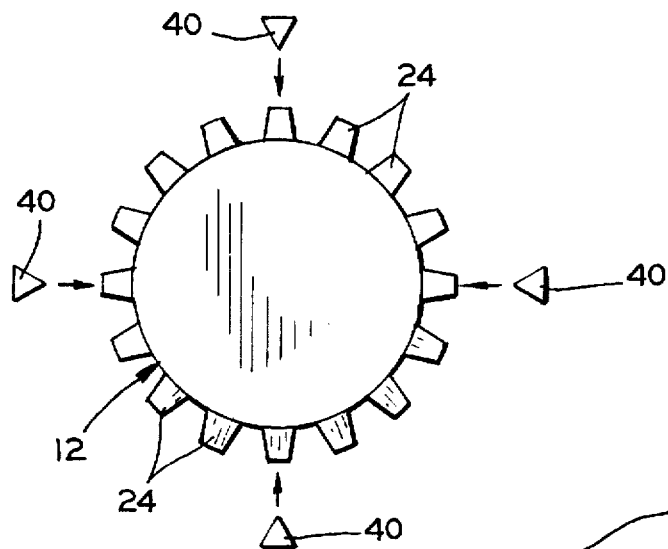
FIG. 3 is a view in elevation of the yoke shaft taken along lines 3—3 of FIG. 1, showing the low friction coating being mechanically perturbed to create selected areas of increased thickness.

Any means suitable for deforming or perturbing the deformable low friction coating can be used. One possible means is a plurality of wedge-shaped members, such as wedges 40, as shown in FIG. 3. The wedges can extend the entire length of the yoke shaft splines 24 along the direction of the central axis 16. By deforming the low friction coating with a wedge, a pair of deformations or nubs 42 can be formed. The nubs are spaced apart by a wedge-shaped depression 44. The wedge-shaped depression can act as a flow channel for lubricants. As can be seen in FIG. 3, the wedges are spaced circumferentially around the yoke shaft 24, and therefore the nubs would also be similarly spaced.

Figure 4:
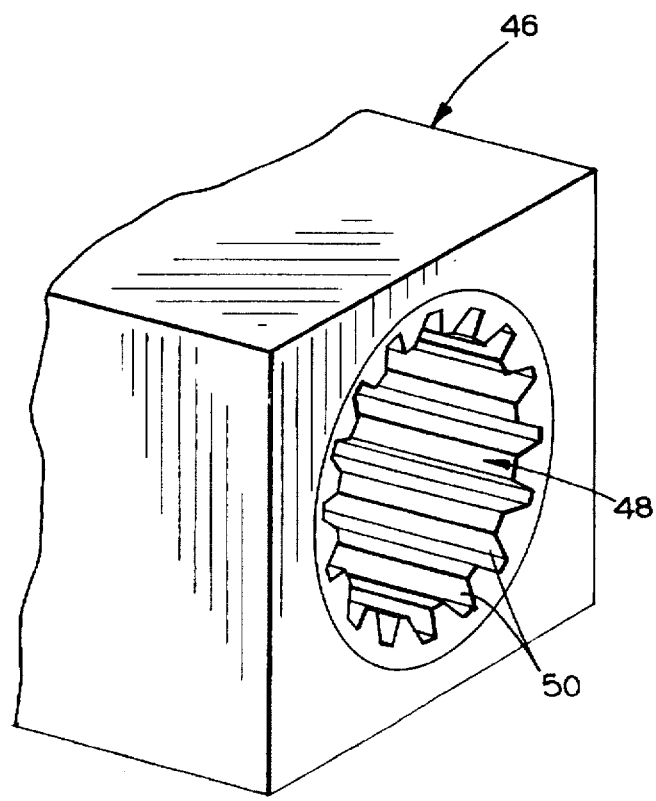
FIG. 4 is a schematic view in perspective illustrating a die which can be used in place of the slip yoke to mold the low friction coating according to the method of the invention.

Although the preferred method of making the drive line slip joint assembly is to insert a yoke shaft 12 into a slip yoke 14, thereby creating a mated pair of drive line slip joint components, a mold or die can be used instead of the slip yoke to form or iron the low friction coating. As shown in FIG. 4, die 46 contains die bore 48 in a manner similar to the internal bore 18 of the slip yoke 14. The die 46 can be made of any suitable material, such as steel, and can be adapted with fluid passageways, not shown, for controlling the temperature. The die bore 48 can be adapted with die splines 50, which are analogous to the slip yoke splines 26. Operation of the coating and ironing process using the die would be similar to the process using a slip yoke as described above.

In operation, either the yoke shaft 12 or the slip yoke 14 of the slip joint assembly 10 is coated with a low friction coating 30. The yoke shaft and the slip yoke are heated to a temperature sufficient to soften or melt the low friction coating to form a liquid layer either on the surface of the externally splined portion 20 of the yoke shaft 12 or on the surface of the splines 26 of the slip yoke. A liquid silicone release agent is applied to the coated part having the low friction coating, by spraying or dipping, which causes a slight cooling of the coated part, and causes the surface of the liquid low friction coating on the coated part to harden or skin over. The yoke shaft is inserted into the internal bore 18 of the slip yoke. The heat of the yoke shaft and the slip yoke cause the low friction coating to flow and conform to the gap between the splines 24 of the yoke shaft and the splines 26 of the slip yoke. The yoke shaft is removed from the slip yoke, and the low friction coating is allowed to cool. When assembled together, the yoke shaft 12 and the slip yoke 14 form a mated pair of drive line slip joint assembly components in which the intermeshing splines 24 and 26 enable relatively easy telescopic movement in the axial direction while transmitting torque from one component to the other without backlash and broken back.

It will be evident from the foregoing that various modifications can be made to this invention. Such, however are considered as being within the scope of the invention.

What is claimed is:

1. A method for making a drive line slip joint assembly having a slip yoke and a yoke shaft, the yoke shaft telescopically engaging an internal bore through one end of the slip yoke, the yoke shaft having an externally splined portion with splines extending radially outwardly from a central axis, and the slip yoke having an internally splined portion with splines extending radially inwardly toward the central axis, with the splines of the yoke shaft intermeshing with the splines of the slip yoke to form a driving connection between the yoke shaft and the slip yoke, comprising the steps of:

a. providing a slip yoke having an internally splined portion with splines extending radially inwardly toward a central axis thereof;

b. providing a yoke shaft having an externally splined portion with splines extending radially outwardly from a central axis thereof;

c. coating the splines of either one of the yoke shaft and the slip yoke with a low friction coating;

d. heating the yoke shaft and the slip yoke to a temperature sufficient to soften the low friction coating, thereby softening said low friction coating;

e. aligning the central axis of the yoke shaft with the central axis of the slip yoke;

f. inserting the yoke shaft into the slip yoke with said central axes coinciding with one another, and said splines of said slip yoke intermeshing with said splines of said yoke shaft while forming a gap therebetween, the low friction coating flowing and conforming in shape to and filling the gap defined between the splines of the yoke shaft and the slip yoke;

g. removing the yoke shaft from the slip yoke;

h. cooling the yoke shaft and the slip yoke such that said low friction coating solidifies and maintains said shape; and i. reinserting the yoke shaft into the slip yoke after cooling of the coating.

2. The method of claim 1 including coating the splines of the yoke shaft with the low friction coating.

3. The method of claim 2 including removing the yoke shaft from the slip yoke prior to said cooling step.

4. The method of claim 2 comprising perturbing the low friction coating prior to cooling, thereby creating selected areas of increased thickness of the low friction coating.

5. The method of claim 4 in which the perturbing step comprises contacting the low friction coating with a wedge-shaped member.

6. The method of claim 2 comprising applying a lubricant to the yoke shaft prior to inserting the yoke shaft into the slip yoke.

7. The method of claim 1 comprising applying a lubricant to the slip yoke prior to inserting the yoke shaft into the slip yoke.

8. The method of claim 1 in which the coefficient of thermal expansion of the low friction coating is greater than the coefficients of thermal expansion of the yoke shaft and the slip yoke.

9. The method of claim 1 comprising coating the splines of the yoke shaft with the low friction coating, the coefficient of thermal expansion of the low friction coating being greater than the coefficients of thermal expansion of the yoke shaft and the slip yoke, applying a lubricant to the coated splines of the yoke shaft prior to inserting the yoke shaft into the slip yoke, removing the yoke shaft from the slip yoke, and cooling the yoke shaft.

10. The method of claim 9 in which at least one of the low friction coating and the lubricant contains moisture, and the temperature of the slip yoke achieved during said heating step is sufficiently high such that the moisture vaporizes, thereby creating depressions in the low friction coating.

11. A method for making a drive line slip joint component for a drive line slip joint assembly having a slip yoke and a yoke shaft, the yoke shaft telescopically engaging an internal bore through one end of the slip yoke, the yoke shaft having an externally splined portion with splines extending radially outwardly from a central axis, and the slip yoke having an internally splined portion with splines extending radially inwardly toward the external axis, with the splines of the yoke shaft intermeshing with the splines of the slip yoke to form a driving connection between the yoke shaft and the slip yoke, comprising the steps of:

a. providing a die including a bore having an internally splined portion with splines extending radially inwardly toward a central axis thereof;

b. providing a yoke shaft having an externally splined portion with splines extending radially outwardly from a central axis thereof;

c. coating the splines of the yoke shaft with a low fiction coating;

d. heating the yoke shaft and the die to a temperature sufficient to soften the low friction coating, thereby softening said low friction coating;

e. aligning the central axis of the yoke shaft with the central axis of the die bore;

f. inserting the yoke shaft into the die bore with said central axes coinciding with one another, and said splines of said die bore intermeshing with said splines of said yoke shaft while defining a gap therebetween, the low friction coating flowing and conforming in shape to and filling the gap defined between the splines of the yoke shaft and the die;

g. removing the yoke shaft from the die bore; and h. cooling the yoke shaft to form a drive line slip joint component such that said low friction coating solidifies and maintains said shape.

12. The method of claim 11 in which at least one of the low friction coating and the lubricant contains moisture, and the temperature of the slip yoke achieved during said heating step is sufficiently high such that the moisture vaporizes, thereby creating depressions in the low friction coating.

13. The method of claim 11 including removing the yoke shaft from the die bore prior to said cooling step.

14. The method of claim 11 comprising perturbing the low friction coating prior to cooling, thereby creating selected areas of increased thickness of the low friction coating.

15. The method of claim 14 in which the perturbing step comprises contacting the low friction coating with a wedge-shaped member.

16. The method of claim 11 comprising applying a lubricant to the yoke shaft prior to inserting the yoke shaft into the die bore.

17. The method of claim 11 comprising applying a lubricant to the slip yoke prior to inserting the yoke shaft into the die bore.

18. The method of claim 11 in which the coefficient of thermal expansion of the low friction coating is greater than the coefficients of thermal expansion of the yoke shaft and the slip yoke.

* * * * *